United States Patent
Arcese et al.

(10) Patent No.: US 8,875,106 B2
(45) Date of Patent: *Oct. 28, 2014

(54) AUTOMATED TESTING PROCESS

(75) Inventors: Mauro Arcese, Rome (IT); Marco Imperia, Rome (IT); Marco Mattia, Rome (IT); Genoveffa Nacchia, Rome (IT); Leonardo Rosati, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/435,954

(22) Filed: Mar. 30, 2012

(65) Prior Publication Data

US 2013/0007714 A1    Jan. 3, 2013

Related U.S. Application Data

(63) Continuation of application No. 13/172,566, filed on Jun. 29, 2011.

(51) Int. Cl.
*G06F 9/44*    (2006.01)
*G06F 11/36*   (2006.01)

(52) U.S. Cl.
CPC ............ *G06F 8/315* (2013.01); *G06F 11/3664* (2013.01)
USPC ............ 717/124; 717/108; 717/116; 717/130

(58) Field of Classification Search
CPC ..... G06F 8/24; G06F 9/4433; G06F 11/3466; G06F 11/3688
See application file for complete search history.

(56) References Cited

U.S. PATENT DOCUMENTS

| | | | |
|---|---|---|---|
| 6,484,276 B1 | 11/2002 | Singh et al. | |
| 7,243,090 B2 | 7/2007 | Kinzhalin et al. | |
| 7,743,367 B1 | 6/2010 | Nikolov et al. | |
| 7,992,130 B2 * | 8/2011 | Bozza et al. | 717/116 |
| 8,132,150 B2 * | 3/2012 | De Sutter et al. | 717/108 |
| 8,245,194 B2 * | 8/2012 | Atkin et al. | 717/124 |
| 2003/0033085 A1 | 2/2003 | Sanchez, II et al. | |
| 2003/0159132 A1 * | 8/2003 | Barnett et al. | 717/124 |
| 2003/0212987 A1 * | 11/2003 | Demuth et al. | 717/130 |
| 2004/0021688 A1 | 2/2004 | Phillips | |
| 2007/0271483 A1 | 11/2007 | Kolawa et al. | |
| 2008/0256517 A1 * | 10/2008 | Atkin et al. | 717/124 |
| 2008/0276227 A1 | 11/2008 | Greifeneder | |
| 2010/0146482 A1 * | 6/2010 | Holtz et al. | 717/116 |

OTHER PUBLICATIONS

Lee et al., Classes and inheritance in actor-oriented design, Jul. 2009, 26 pages.*

(Continued)

*Primary Examiner* — Thuy Dao

(74) *Attorney, Agent, or Firm* — Holland & Knight LLP; Brian J. Colandreo, Esq.; Jeffrey T. Placker, Esq.

(57) ABSTRACT

A method, computer program product, and system for automating a test environment is provided. The method may include providing, at one or more computing devices, a superclass and a class-under-test, the superclass and the class-under-test having an inheritance chain therebetween. The method may further include inserting, via the computing device, an intermediate mock class between the superclass and the class-under-test. The method may also include automatically modifying, via the computing device, the class-under-test at runtime.

9 Claims, 5 Drawing Sheets

(56) References Cited

OTHER PUBLICATIONS

Sobering et al., Pseudo-classes: very simple and lightweight mockObject-like classes for unit-testing, Oct. 2004, 2 pages.*

Islam et al., Dsc+Mock: a test case + mock class generator in support of coding against interfaces, Jul. 2010, 6 pages.*

Saff et al., "Automatic Test Factoring for Java," MIT Computer Science and Artificial Intelligence Lab, http://publications.csail.mit.edu/lcs/pubs/pdf/MIT-LCS-TR-991.pdf, downloaded Jun. 2011, pp. 1-10.

"Mocking Classes with jMock and the ClassImposteriser," http://www.jmock.org/mocking-classes.html, downloaded Sep. 28, 2010, pp. 1-2.

"An Agile Dynamic Language for the Java Platform," http://groovy.codehaus.org, downloaded Sep. 28, 2010, pp. 1-5.

Harold, "Easier Testing wiht EasyMock," http://www.ibm.com/developerworks/java/library/j-easymock.html, downloaded Sep. 28, 2010, pp. 1-11.

McGachey et al., "Classifying Java Class Transformations for Pervasive Virtualized Access," Department of Computer Science, Purdue University, West Lafayette, IN, Oct. 4-5, 2009, pp. 1-9.

AspectWerkz-Plain Java AOP—Weaving, http://aspectwerkz.codehaus.org/weaving.html, downloaded Jun. 29, 2011, pp. 1-18.

Lee et al., Classes and Inheritance in Actor-Oriented Design, ACM Transactions on Embedded Computing Systems, vol. 8, No. 4, Article 29, Publication Date: Jul. 2009, 26 pages.

Wehr et al., "JavaGI: The Interaction of Type Classes with Interfaces and Inheritance," ACM Transactions on Programming Languages and Systems, vol. 33, No. 4, Article 12, Publication Date: Jul. 2001, 83 pages.

\* cited by examiner

AUTOMATED TESTING PROCESS

RELATED APPLICATIONS

The subject application is a continuation application of U.S. patent application with Ser. No. 13/172,566, filed Jun. 29, 2011, the entire content of which is herein being incorporated by reference.

BACKGROUND OF THE INVENTION

In order to ensure an acceptable level of quality tests are crucial in the software development process. Performing tests manually generally takes a great deal of time. However, the majority of software tests can be automated. Currently, there are various types of test automation frameworks available in the field that attempt to satisfy most of the requirements that usually are related to such kind of harnesses, such as tools integration, legacy tools support, ease of use, data integration, reporting features, shell script support, automatic environment setup, remote command execution, and so on.

One of the aspects where there are still deficiencies is related to the availability of test frameworks that allows to emulate missing runtime artifacts that the classes under tests require. Typical examples may be represented by classes that need to run queries toward a database; by classes that require a http session to handle UI events generated by a user; and so on.

In all such cases there may be problems when testing such classes since it may be difficult to reproduce all the required runtime artifacts. For these reasons several tools/frameworks exist on the market that allow to create mock objects to test classes without requiring that all their pre-requisite objects exists in the runtime environment where the class get instantiated and used.

Most of those tools provide ways to define mock objects by mean of a declarative language: in some cases (such as in the JMockit tool) this may be accomplished by leveraging Java annotations; in other cases (such as in AspectJ) this may be accomplished by providing a new language to be integrated with the Java one; etc.

BRIEF SUMMARY OF THE INVENTION

In a first embodiment, a method for automating a test environment is provided. The method may include providing, at one or more computing devices, a superclass and a class-under-test, the superclass and the class-under-test having an inheritance chain therebetween. The method may further include inserting, via the computing device, an intermediate mock class between the superclass and the class-under-test. The method may also include automatically modifying, via the computing device, the class-under-test at runtime.

One or more of the following features may be included. In some embodiments, automatically modifying may include overriding one or more methods of the superclass. In some embodiments, the superclass may include a plurality of superclasses. In some embodiments, overriding one or more methods may include generating fake data without accessing a database. The method may further include loading at least one of the superclass and the class-under-test into a memory. The method may also include patching, using a byte-code transformer engine, byte-code of the loaded class according to at least one user-defined rule. In some embodiments, the byte-code transformer engine may be configured to communicate with at least one of a class repository and a configuration repository. In some embodiments, the class repository may include a directory having one or more mock classes and the configuration repository includes one or more filters configured to identify a class to be instrumented and its corresponding mock class.

In a second embodiment, a computer program product may reside on a computer readable storage medium and may have a plurality of instructions stored on it. When executed by a processor, the instructions may cause the processor to perform operations including providing, at one or more computing devices, a superclass and a class-under-test, the superclass and the class-under-test having an inheritance chain therebetween. Operations may further include inserting, via the computing device, an intermediate mock class between the superclass and the class-under-test. Operations may also include automatically modifying, via the computing device, the class-under-test at runtime.

One or more of the following features may be included. In some embodiments, automatically modifying may include overriding one or more methods of the superclass. In some embodiments, the superclass may include a plurality of superclasses. In some embodiments, overriding one or more methods may include generating fake data without accessing a database. Operations may further include loading at least one of the superclass and the class-under-test into a memory. Operations may also include patching, using a byte-code transformer engine, byte-code of the loaded class according to at least one user-defined rule. In some embodiments, the byte-code transformer engine may be configured to communicate with at least one of a class repository and a configuration repository. In some embodiments, the class repository may include a directory having one or more mock classes and the configuration repository includes one or more filters configured to identify a class to be instrumented and its corresponding mock class.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to provide at one or more computing devices, a superclass and a class-under-test, the superclass and the class-under-test having an inheritance chain therebetween. The computing system may further include a second software module executable by the at least one processor and the at least one memory architecture, wherein the second software module is configured to insert, via the computing device, an intermediate mock class between the superclass and the class-under-test. The computing system may further include a third software module executable by the at least one processor and the at least one memory architecture, wherein the third software module is configured to automatically modify, via the computing device, the class-under-test at runtime.

One or more of the following features may be included. In some embodiments, automatically modifying may include overriding one or more methods of the superclass. In some embodiments, the superclass may include a plurality of superclasses. In some embodiments, overriding one or more methods may include generating fake data without accessing a database. The computing system may further include one or more additional software modules configured to load at least one of the superclass and the class-under-test into a memory. The computing system may further include one or more additional software modules configured to patch, using a byte-code transformer engine, byte-code of the loaded class according to at least one user-defined rule. In some embodiments, the byte-code transformer engine may be configured to communicate with at least one of a class repository and a configuration repository. In some embodiments, the class repository may include a directory having one or more mock classes and the configuration repository includes one or more filters configured to identify a class to be instrumented and its corresponding mock class.

In a fourth embodiment, a method for automating a test environment is provided. The method may include providing, at one or more computing devices, a superclass and a class-under-test, the superclass and the class-under-test having an inheritance chain therebetween. The method may further include inserting, via the computing device, an intermediate mock class between the superclass and the class-under-test. The method may also include automatically modifying, via the computing device, the class-under-test at runtime. The method may also include loading, via the computing device, at least one of the superclass and the class-under-test into a memory. The method may additionally include patching, using a byte-code transformer engine, byte-code of the loaded class according to at least one user-defined rule. In some embodiments, for each class being loaded, the method may further include determining, via the computing device, if the class matches a configured filter. The method may also include transforming, via the computing device, the byte code of the loaded class by replacing one or more references to the superclass with a reference to the intermediate mock class. The method may also include instantiating, via the computing device, the transformed class.

In a fifth embodiment, a computer program product may reside on a computer readable storage medium and may have a plurality of instructions stored on it. When executed by a processor, the instructions may cause the processor to perform operations including providing, at one or more computing devices, a superclass and a class-under-test, the superclass and the class-under-test having an inheritance chain therebetween. Operations may further include inserting, via the computing device, an intermediate mock class between the superclass and the class-under-test. Operations may also include automatically modifying, via the computing device, the class-under-test at runtime. Operations may also include loading, via the computing device, at least one of the superclass and the class-under-test into a memory. Operations may additionally include patching, using a byte-code transformer engine, byte-code of the loaded class according to at least one user-defined rule. In some embodiments, for each class being loaded, operations may further include determining, via the computing device, if the class matches a configured filter. Operations may also include transforming, via the computing device, the byte code of the loaded class by replacing one or more references to the superclass with a reference to the intermediate mock class. Operations may also include instantiating, via the computing device, the transformed class. In some embodiments, the test environment may be a Java test environment.

The details of one or more implementations are set forth in the accompanying drawings and the description below. Other features and advantages will become apparent from the description, the drawings, and the claims.

DETAILED DESCRIPTION OF THE INVENTION

Figure 1:
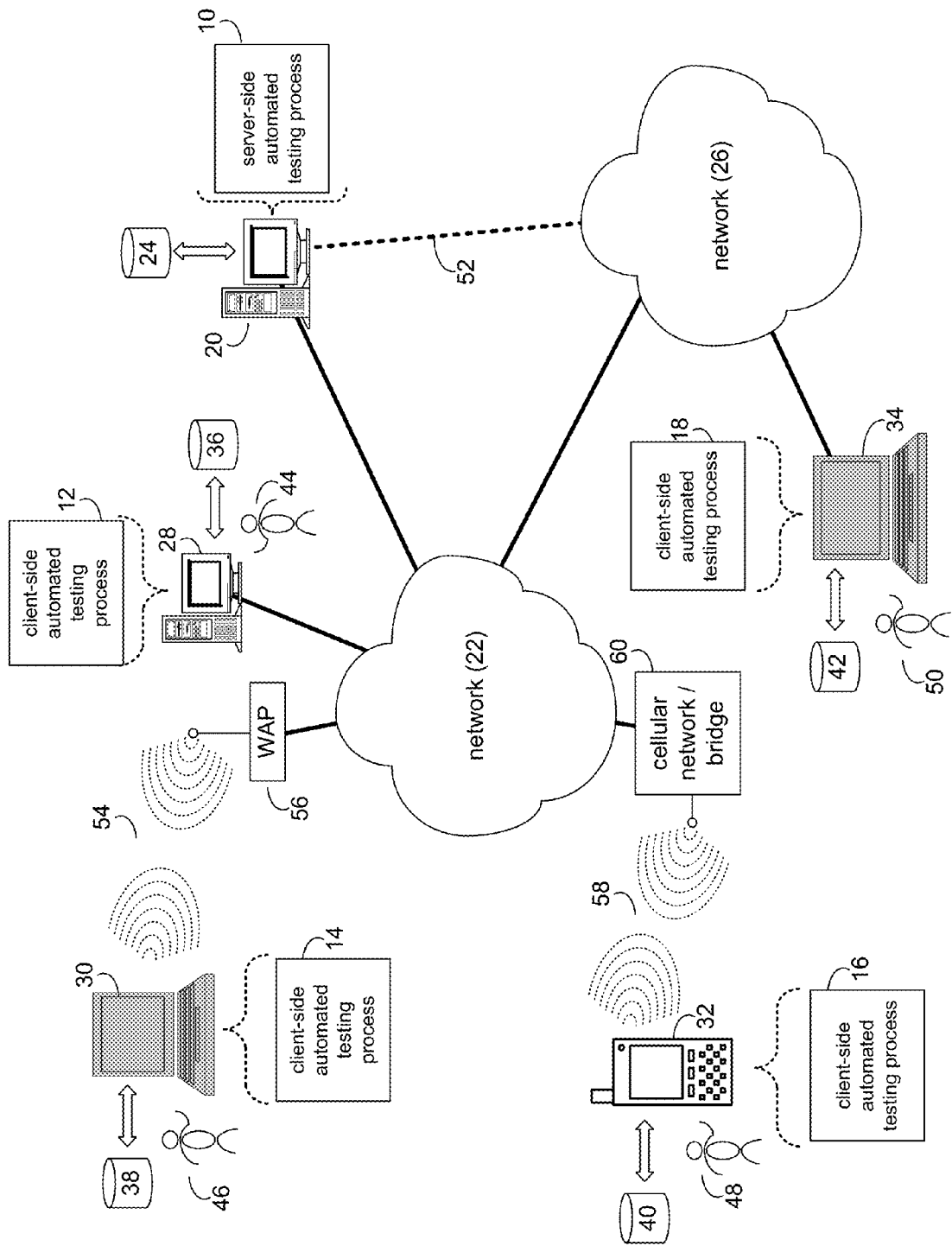
FIG. 1 is a diagrammatic view of an automated testing process coupled to a distributed computing network in accordance with the present disclosure.
Figure 2:
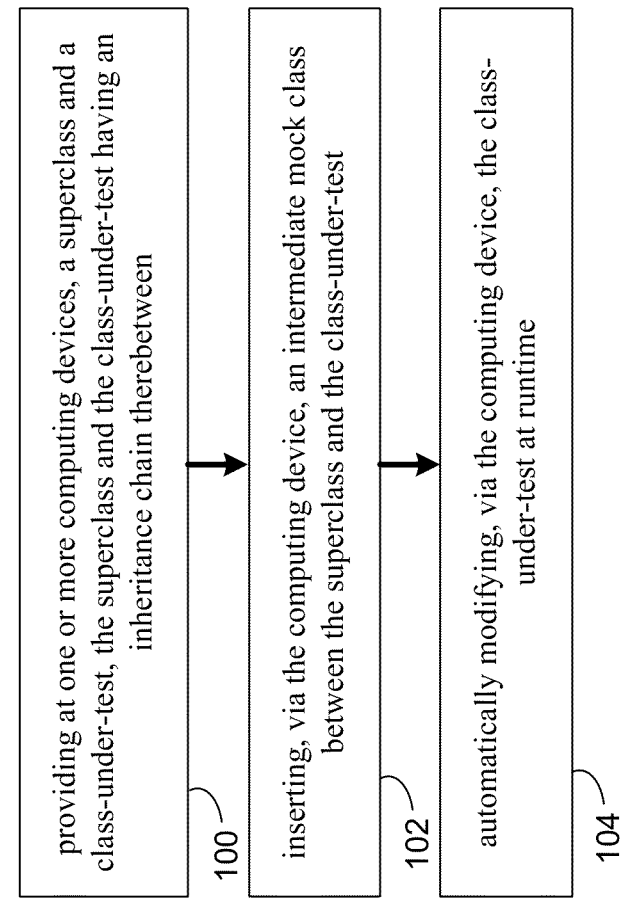
FIG. 2 is a flowchart of the automated testing process of FIG. 1 in accordance with the present disclosure.

Referring to FIGS. 1 & 2, there is shown an automated testing process 10. As will be discussed below, automated testing process 10 may provide (100), at one or more computing devices, a superclass and a class-under-test, the superclass and the class-under-test having an inheritance chain therebetween. Automated testing process 10 may also be configured to insert (102), via the computing device, an intermediate mock class between the superclass and the class-under-test. Automated testing process may also automatically modify (104), via the computing device, the class-under-test at runtime.

The automated testing process may be a server-side process (e.g., server-side process 10), a client-side process (e.g., client-side process 12, client-side process 14, client-side process 16, or client-side process 18), or a hybrid server-side/client-side process (e.g., the combination of server-side automated testing process 10 and one or more of client-side processes 12, 14, 16, 18).

Server-side automated testing process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side automated testing process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown)

and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side processes 12, 14, 16, 18 and/or server-side automated testing process 10 may be processes that run within (e.g., are part of) a software testing system and/or application. Alternatively, client-side automated testing processes 12, 14, 16, 18 and/or server-side automated testing process 10 may be stand-alone applications that work in conjunction with the software testing system and/or application. One or more of client-side processes 12, 14, 16, 18 and server-side automated testing process 10 may interface with each other (via network 22 and/or network 26).

Users 44, 46, 48, 50 may access server-side automated testing process 10 directly through the device on which the client-side process (e.g., client-side processes 12, 14, 16, 18) is executed, namely client electronic devices 28, 30, 32, 34, for example. Users 44, 46, 48, 50 may access server-side automated testing process 10 directly through network 22 and/or through secondary network 26. Further, server computer 20 (i.e., the computer that executes server-side automated testing process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Automated Testing Process

For the following discussion, server-side automated testing process 10 will be described for illustrative purposes. It should be noted that client-side automated testing process 12 may be incorporated into server-side automated testing process 10 and may be executed within one or more applications that allow for communication with client-side automated testing process 12. However, this is not intended to be a limitation of this disclosure, as other configurations are possible (e.g., stand-alone, client-side automated testing processes and/or stand-alone server-side automated testing processes.) For example, some implementations may include one or more of client-side automated testing processes 12, 14, 16, 18 in place of or in addition to server-side automated testing process 10.

Referring again to FIGS. 1 & 2, there is shown an automated testing process 10. As will be discussed below, automated testing process 10 may provide (100), at one or more computing devices, a superclass and a class-under-test, the superclass and the class-under-test having an inheritance chain therebetween. Automated testing process 10 may also be configured to insert (102), via the computing device, an intermediate mock class between the superclass and the class-under-test. Automated testing process may also automatically modify (104), via the computing device, the class-under-test at runtime.

In some embodiments, the teachings of the present disclosure may be used in accordance with any number of programming languages. Some of the discussion included within this document pertains to the Java programming language, however, this is merely provided for exemplary purposes as the present invention may be used in accordance with any other suitable programming language.

In some embodiments, automated testing process 10 may be configured to transparently inject mock objects into the application classes for modifying their behavior without requiring changes to the application classes under test and without most of the limitations of the tools described above. The automated testing process described herein does not require a user to learn a new "language" or a new tool for writing tests and is therefore easy to use from a user's perspective. Further, the automated testing process is easy to integrate into existing test suites (e.g., a JUnit-based test suite, etc.). In some embodiments, the automated testing process may include replacing at runtime the inheritance chain of a given class by injecting an intermediate mock class between the class under test and its super-class(es). The injected class, being part of the class hierarchy chain, may have direct access to all of the superclass methods and superclasses that are inherited by the class itself.

Figure 3:
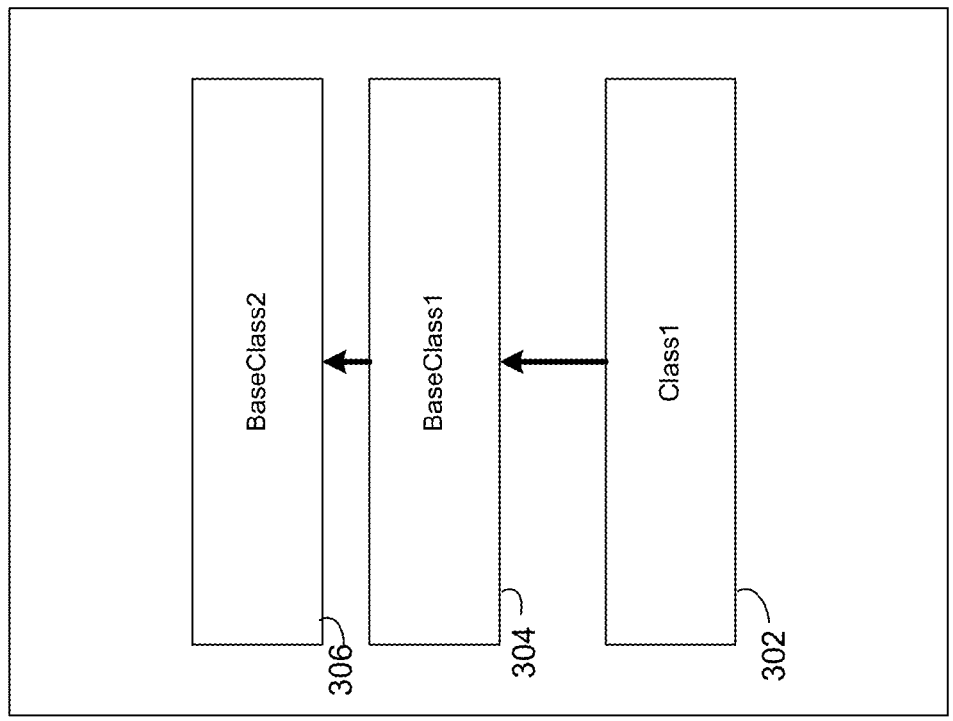
FIG. 3 depicts an exemplary class inheritance structure.
Figure 4:
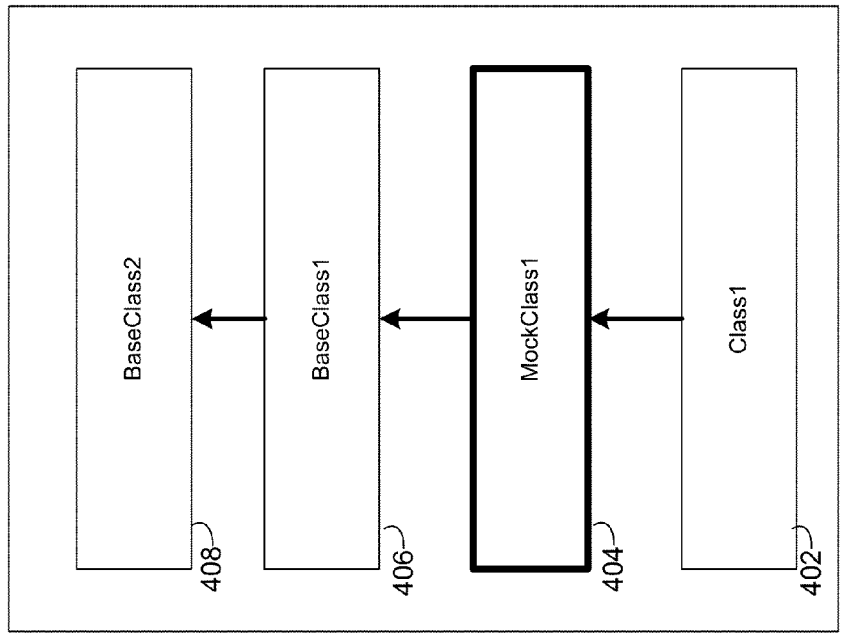
FIG. 4 depicts an exemplary class inheritance structure in accordance with the automated testing process of the present disclosure.

Referring now to FIGS. 3-4, embodiments depicting class inheritance structures are provided. Diagram 300, shown in FIG. 3, depicts an existing class inheritance relationship. For example, in the Java programming language, each class is allowed to have one direct superclass, and each superclass has the potential for an unlimited number of subclasses. Diagram 300 depicts Class1 302 having superclass BaseClass1 304, which in turn, has its own superclass BaseClass2 306.

Diagram 400, shown in FIG. 4, depicts a class inheritance relationship consistent with the teachings of the present disclosure. Diagram 400 depict Class1 402 having superclass MockClass1, which in turn, has its own superclass BaseClass1 406, which in turn, has its own superclass BaseClass2 408.

In this particular example, using the class MockClass1 one or more methods defined by BaseClass1 and/or BaseClass2 may be overridden to modify their original behavior. The following depicts a practical example showing one possible way in which this may be achieved.

Assume that Class1 is defined in this way:

```
public class Class1 extends BaseClass1 {
public void doSomething( ){
List l = getRecordSet( );
// Do something with 'l'
// ...
}
// ...
}
```

Where BaseClass1 is defined in this way:

```
publicclass BaseClass1 {
public List getRecordSet( ){
List l = null;
/* Retrieves the list of elements by querying a
database
* through a JDBC connection */
// ...
return l;
}
// ...
}
```

The doSomething( ) method of Class1 calls the getRecordSet( ) method, defined by its super-class BaseClass1, to retrieve a list of elements from a database. Then using the returned list it performs some internal processing. In some embodiments, in order to test the method doSomething( ) belonging to Class1 without having all the runtime elements (and in particular the database server that is queried) required by the application automated testing process 10 may leverage this system by defining a mock class in this way:

```
public class MockClass1 extends BaseClass1 {
public List getRecordSet( ){
List l = new ArrayList( );
/* Fill in the list of elements by generating them
locally
* without the need to access an external database
*/
// ...
l.add("Fake Data 1");
l.add("Fake Data 2");
l.add("Fake Data 3");
// ...
return l;
}
// ...
}
```

In some embodiments, automated testing process 10 may, at runtime, when the application is started and the class Class1 is loaded into the Java Virtual Machine the system may be automatically modified in the following manner:

```
public class Class1 extends MockClass1 {
public void doSomething( ){
List l = getRecordSet( );
// Do something with 'l'
// ...
}
// ...
}
```

In some embodiments of automated testing process 10, the super-class of Class1 may be replaced by the class Mock-Class1 that overrides the getRecordSet( ) method of Base-Class1 with a version that simply generates fake data without the need to access a real database.

Figure 5:
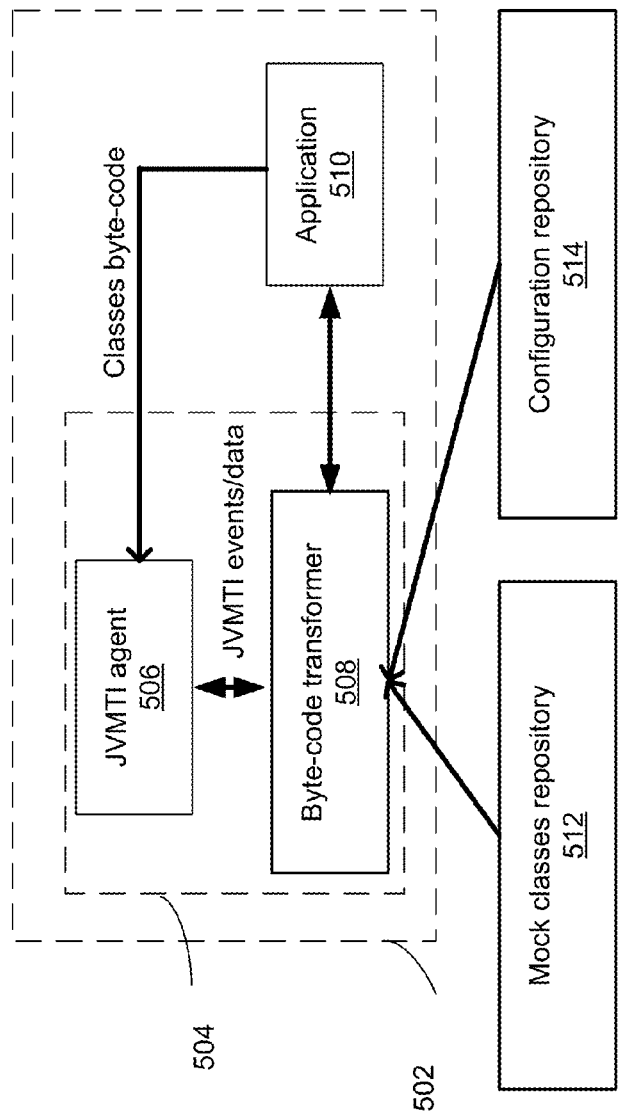
FIG. 5 is a system diagram depicting an exemplary embodiment of the automated testing process of the present disclosure

Referring now to FIG. 5, a system 500 showing a system used to instrument a Java application in accordance with an embodiment of automated testing method 10 of the present disclosure is provided. System 500 depicts Java execution environment 502 and tool boundary 504. Tool boundary 504 may include Java Virtual Machine Tool Interface ("JVMTI") agent 506, which may be operatively connected with byte-code transformer 508. Both JVMTI agent 506 and byte-code transformer 508 may be operatively connected with application 510. Byte-code transformer 508 may be operatively connected with both mock classes repository 512 and configuration repository 514.

In some embodiments, JVMTI agent 506 may be used to intercept the JVMTI_EVENT_CLASS_FILE_LOAD_HOOK event generated by the Java Virtual Machine (i.e., a virtual machine capable of executing java bytecode) each time a new class in loaded into memory. Upon intercepting such events the agent may call the byte-code transformer engine that may, in turn, patch the byte-code of the class that is being loaded according to the rules specified by the user. Associated to this module there may be one or more additional artifacts. For example, mock class repository 512 (e.g., a directory in the file system) may contain the mock classes that are added by the transformation process. Additionally and/or alternatively, configuration repository 514 may include the definitions of the filters used to identify the classes to be instrumented. Configuration repository 514 may also identify the corresponding mock class to replace and define one or more tuning parameters used by system 500.

In some embodiments, when it is triggered by the Java Virtual Machine, byte-code transformer module 508 may perform a variety of different operations. For example, for each class being loaded the byte-code transformer module may determine if the class matches one of the configured filters (e.g., check if the class implements or extends one of the classes/interfaces specified by the filter; or check if the class-name matches a given regular expression specified by the filter, etc.). In some embodiments, if the class does not match any filter then it does not need to be instrumented and byte-code transformer 508 may return without doing anything. However, if there is a match then byte-code transformer module 508 may be configured to transform the byte-code of the class by replacing all the references to its super-class with a corresponding reference to the new super-class.

In some embodiments, transforming the byte-code may include some or all of the following operations. This transformation may include, but is not limited to, parsing the class byte-code and extract the reference to its super-class, calculating the name of the new super-class according to the substitution rules specified in the system's configuration, adding the new super-class name reference to the constant pool, and replacing the class' super-class index with the one (just added to the constant pool) that refers to the new super-class name. Additionally, for each method defined by the class, transforming may include iterating through its op-codes to search for any occurrence of INVOKESPECIAL op-codes that reference the original super-class name. For each of such op-codes, this may include replacing the reference to the original super-class name with a reference to the new super-class name. Once the class has been transformed it may be instantiated by the Java Virtual Machine and may become part of the application as all the other not transformed classes.

In some embodiments, one possible embodiment of automated testing process 10 described herein may be through a jar file that may contain some or all of the implementation classes for the instrumentation agent. In this way, automated testing process 10 may be directly added and enabled into any application (e.g., a Java application which may include a JUnit test suite) by adding the following option when starting the Java Virtual Machine: -javaagent:<mock.transformer.jar> where mock.transformer.jar is the name of the .jar file containing the implementing classes of the tool. As discussed herein, numerous other implementations are possible (e.g., also applicable to other programming languages, besides Java) that in any case do not change the basic idea behind the automated testing process 10 described herein.

Additionally and/or alternatively, in some embodiments, if it would be desirable to modify the configuration layer of an already written Java application automated testing process 10 may be used in the following manner. Assume that the application retrieves its configuration by extending a given Java class provided by the runtime environment where the application is running (e.g., a Websphere application server). Using automated testing process 10 it may be possible to inject between the application class and the runtime class a custom defined class that may intercept the calls done toward the application runtime class and may redirect them to the custom class. Inside this custom class it may then be possible to retrieve the requested configuration by getting it from a different repository. Additionally, since the custom class may be injected into the inheritance chain of the application class it may have access to all the methods/attributes of the runtime class that it extends. This example is provided merely for exemplary purposes as there are numerous other contexts where automated testing process 10 may be utilized.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer-implemented method for automating a test environment, the method comprising:
    providing, at one or more computing devices, a superclass and a class-under-test, the superclass and the class-under-test having an inheritance chain therebetween;
    inserting, via the computing device, an intermediate mock class between the superclass and the class-under-test, including the ability to intercept calls to the class-under-test and redirecting them to the intermediate mock class; and
    automatically modifying, via the computing device, the class-under-test at runtime.

2. The method of claim 1, wherein automatically modifying includes overriding one or more methods of the superclass.

3. The method of claim 1, wherein the superclass include a plurality of superclasses.

4. The method of claim 2, wherein overriding one or more methods includes generating fake data without accessing a database.

5. The method of claim 1, further comprising:
    loading at least one of the superclass and the class-under-test into a memory.

6. The method of claim 5, further comprising:
    patching, using a byte-code transformer engine, byte-code of the loaded class according to at least one user-defined rule.

7. The method of claim 6, wherein the byte-code transformer engine is configured to communicate with at least one of a class repository and a configuration repository.

8. The method of claim 7, wherein the class repository includes a directory having one or more mock classes and the configuration repository includes one or more filters configured to identify a class to be instrumented and its corresponding mock class.

9. A computer-implemented method for automating a test environment, the method comprising:
    providing, at one or more computing devices, a superclass and a class-under-test, the superclass and the class-under-test having an inheritance chain therebetween;
    inserting, via the computing device, an intermediate mock class between the superclass and the class-under-test, including the ability to intercept calls to the class-under-test and redirecting them to the intermediate mock class;
    automatically modifying, via the computing device, the class-under-test at runtime;
    loading, via the computing device, at least one of the superclass and the class-under-test into a memory;
    patching, using a byte-code transformer engine, byte-code of the loaded class according to at least one user-defined rule;
    for each class being loaded, determining, via the computing device, if the class matches a configured filter;
    transforming, via the computing device, the byte code of the loaded class by replacing one or more references to the superclass with a reference to the intermediate mock class; and
    instantiating, via the computing device, the transformed class.

* * * * *